April 8, 1947.  W. H. RIGGAN  2,418,527
ARTIFICIAL LURE
Filed Aug. 31, 1945  2 Sheets-Sheet 1

Inventor
William Henry Riggan

By Clarence A. O'Brien
and Harvey B. Jacobson
Attorneys

April 8, 1947. W. H. RIGGAN 2,418,527
ARTIFICIAL LURE
Filed Aug. 31, 1945 2 Sheets—Sheet 2
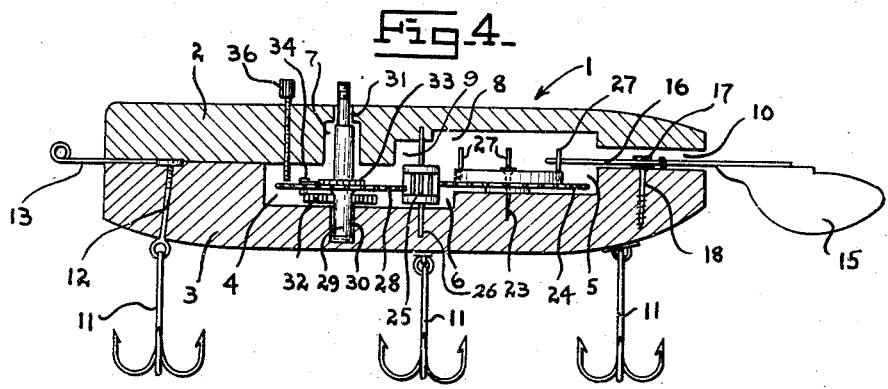
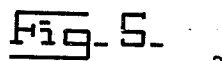
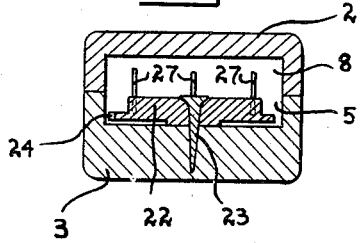
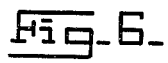
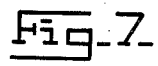
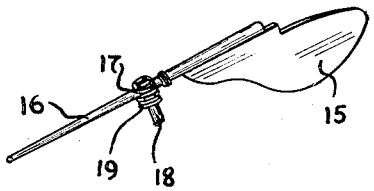
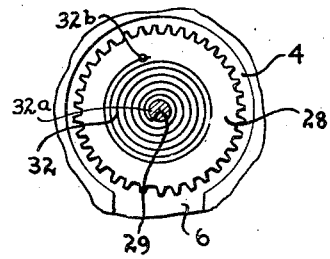
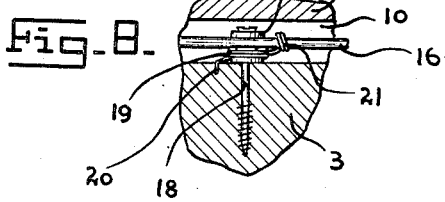
Inventor
William Henry Riggan
By Clarence A. O'Brien
and Harvey B. Jacobson
Attorneys Patented Apr. 8, 1947

2,418,527

UNITED STATES PATENT OFFICE 2,418,527

ARTIFICIAL LURE

William Henry Riggan, Warrenton, N. C.

Application August 31, 1945, Serial No. 613,844

5 Claims. (Cl. 43—43)

This invention relates to an artificial lure used when trolling for game fish and it is one object of the invention to provide a lure consisting of a body shaped to resemble natural food of fish and equipped with propelling means of such construction that the lure will be impelled forwardly in a manner resembling the movements of a frog or other natural food of fishes.

Another object of the invention is to provide a lure wherein a paddle or propeller is mounted at the rear end of the body of the lure and is actuated by mechanism within the body portion of the lure, the actuating mechanism being driven by a spring which may be wound and will impart movement to the mechanism and cause the lure to be impelled forwardly for a long distance.

Another object of the invention is to provide the lure with a paddle having an arm extending into the body portion of the lure longitudinally thereof and intermittently engaged by abutments forming part of the driving mechanism and thereby cause the lure to be spasmodically impelled forwardly and thus cause the lure to move forwardly in a succession of movements instead of in a continuous movement.

Another object of the invention is to provide the lure with driving mechanism which may be controlled for speed of operation and thereby control the speed at which the lure is impelled forwardly through water when in use. The invention is illustrated in the accompanying drawings, wherein:

Figure 4 is a sectional view taken longitudinally through the lure,

Figure 5 is a sectional view taken transversely through the lure,

Figure 6 is a perspective view of the paddle or impeller,

Figure 7 is a view showing the cover of the power unit removed, and

Figure 8 is a fragmentary sectional view taken longitudinally through the rear portion of the lure and illustrating the manner in which the impeller is pivotally mounted.

Figure 1:
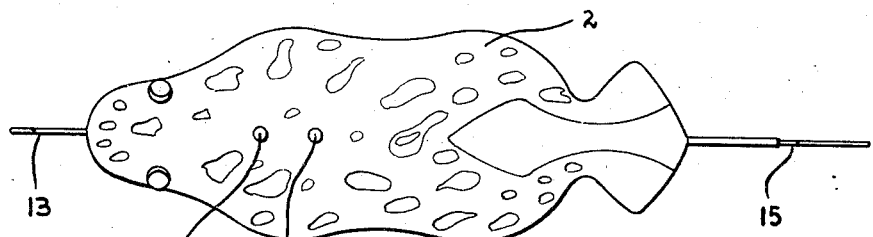
Figure 1 is a top plan view of the improved lure.

This improved lure has a body 1 formed of wood or other material which will float in water. The body has an upper section 2 and a lower section 3 which is firmly secured to the upper section by waterproof glue, or in any other manner desired. In the present illustration, the body is shaped and colored to represent a frog, but it will be understood that the body may be shaped and colored to represent any natural food of fishes for which the lure is intended.

A recess having front and rear portions 4 and 5 connected by a reduced portion 6 is formed in the inner face of the lower section 3 and the upper section is formed in its inner face with a recess 7 registering with the recess 4 centrally thereof and with a rear recess 8 which registers with the recess 5 of the lower section and has a forward extension 9 which registers with the intermediate portion 6 of the recess of the lower section. At its rear end, the upper section is formed with a recess or pocket 10 which extends longitudinally thereof and has its inner front end communicating with the recess 8.

Referring to Figure 4, it will be seen that the registering recesses provide the lure with a longitudinally extending internal pocket having front and rear portions connected by a reduced neck and that the passage 10 leads from this pocket to the rear end of the lure. Hooks 11 are suspended under the body of the lure and upon referring to Figure 4, it will be seen that the mounting member 12 for the front hook extends entirely through the lower section with its upper end serving as anchoring means for a bridle 13 by means of which the lure is to be connected with a fishing line. A groove 14 is formed in the inner face of the lower section 3 to receive the bridle and prevent the bridle from having swinging movement transversely of the lure.

Figure 3:
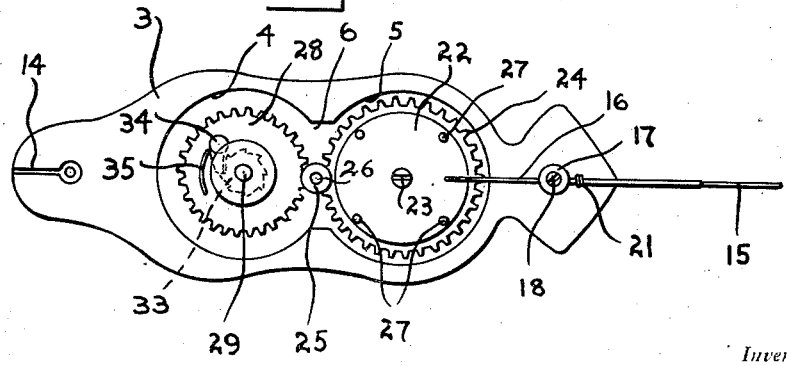
Figure 3 is a view showing the upper portion of the lure removed.

In order to impel the lure forwardly, there has been provided a paddle 15 which extends rearwardly from the body of the lure and is fixed to a shank or arm 16 formed of stiff wire or other suitable material. The shank or arm extends longitudinally through the passage 10 and adjacent the front end of the paddle is formed with an eye 17 through which passes a screw 18 by means of which the shank is pivotally mounted so that the paddle may have swinging movement transversely of the lure. A spring 19 is coiled about the screw or pivot pin 18 and has one end bent to form a pin 20 which is driven into the lower section 3 and its other end bent to form a hook 21 for engaging about the shank rearwardly of the pin or screw and normally holding the shank in a position in which it extends axially of the lure. When pressure is applied to the forward end of the shank or arm 16 transversely thereof, the arm will be swung transversely of the lure in one direction, and when the front end of the arm is released, the spring will quickly return the arm and the paddle to the normal position shown in Figure 3 and the lure will be impelled forwardly through water.

In order to intermittently impart swinging movement to the arm and then release it for quick return to its normal position, there has been provided a disk 22 which is rotatably mounted in the recess 5 by a screw 23. This disk is formed about the periphery of its lower portion with gear teeth 24, and therefore may be referred to as gear which meshes with a small pinion 25 which occupies the throat 6 connecting the front and rear recesses 4 and 5. The shaft 26 of the pinion 25 is of such length that its upper and lower portions may be imbedded in the upper and lower sections and very effectively serves to rotatably mount the pinion. Lugs 27 project upwardly from the disk 22 in spaced relation to each other circumferentially thereof and as this disk or gear is turned about the screw 23, the lugs or pins will successively engage the shank or arm 16 so that the paddle will be swung to one side and then released as the lug moves out of engagement with the front end of the arm and quickly returns to its normal position. It will thus be seen that the lure will be impelled forwardly through the water in a succession of quick movements instead of in a continuous movement, and the movement of the lure will closely resemble the natural movement of a frog in water.

A driving element or motor is mounted in the forward recess 4 and consists of a toothed disk or plate 28 which fits loosely about a shaft 29 disposed vertically of the body with its lower portion rotatably mounted in a well or socket 30 formed in the lower section centrally of the recess 4 and its upper portion passing through the recess 7 and outwardly through an opening 31 leading from the recess 7 and threaded so that a key may be detachably applied to the protruding upper end of the shaft and the shaft turned to wind a spring 32 coiled about the shaft 30 under the plate 28. This spring has one end anchored as at 32a to the shaft and its other end anchored as at 32b to the plate or gear 28 and when the spring is wound and then starts to unwind, the gear or plate 28 will be turned about the shaft and rotary motion imparted to the pinion 25 with which the gear 28 meshes so that rotary motion will thus be transmitted to the gear or plate 22. A ratchet 33 is fixed to the shaft 29 and engaged by a pawl 34 which is pivoted to the gear or plate 28 and yieldably held in engagement with the ratchet by a leaf spring 35. A screw 36 is threaded through the upper section with its lower portion protruding into the recess 4 and when this stem is screwed inwardly, it will engage the gear or disk 28 and prevent rotation thereof while the shaft is being turned to wind the spring.

Figure 2:
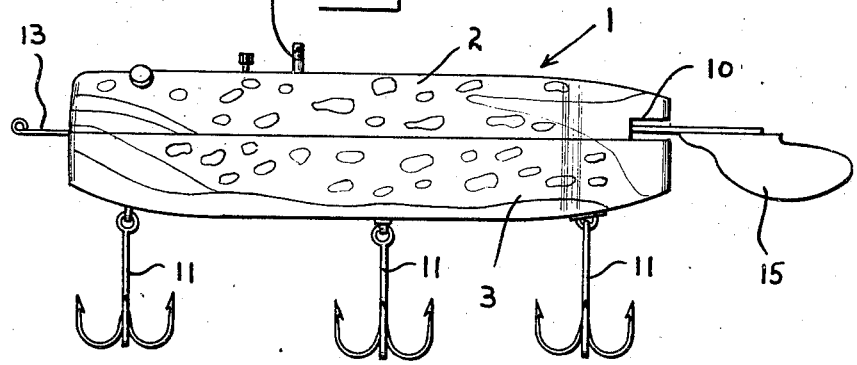
Figure 2 is a side elevation of the improved lure.

When this lure is in use, a fishing line is tied through the eye of the anchor 13 and the shaft 29 turned to wind the spring. The stem or screw 36 is then loosened to release the gear plate or disk 28 and a cast made. The weight of the hooks and the fact that the driving unit and gears 25 and 22 are in the lower section of the body will cause the lure to float upon the water in the position shown in Figure 2. As the disk or gear 22 turns, the lugs or pins 27 will successively engage the front end portion of the arm 16 and cause the paddle to be swung toward one side and then released so that the spring 19 may quickly return it to its normal position. Since the paddle will be intermittently swung to one side and then released for quick return, it will impart forward movement to the lure at spaced intervals of time and the lure will be intermittently propelled forwardly through the water, and since the lure will be impelled forwardly by movements closely resembling those of a frog, a fish which naturally feeds upon swimming frogs will be attracted to the lure and caught by the hooks 11 when it attempts to swallow the lure.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

What I claim is:

1. An artificial lure comprising a body of buoyant material consisting of upper and lower sections in face-to-face engagement with each other, confronting faces of the sections being formed with registering recesses defining front and rear pockets connected by an intermediate throat and a passage leading from the rear pocket through the rear end of the body, a paddle rearwardly of said body having a shank extending through the rear passage with its forward portion extending into the rear pocket and constituting an arm, a pin passing through an eye formed intermediate the length of said arm and into the lower section and pivotally mounting the arm for swinging movement of the paddle, a spring about said pin yieldably holding the arm and paddle in a normal position axially of the body, a disk rotatably mounted in the rear pocket and having gear teeth about its periphery, lugs projecting upwardly from said disk in spaced relation to each other circumferentially thereof for successively engaging said arm and intermittently imparting swinging movement to the arm and the paddle as the disk turns, said spring returning the arm and the paddle to the normal position as the lugs move out of engagement with the arm, a pinion rotatably mounted in said throat and meshing with the teeth of said disk, a shaft rotatably mounted in the forward pocket with its upper portion protruding from the upper section and adapted for engagement by turning means, a toothed plate about said shaft meshing with said pinion for turning the pinion and imparting rotary motion to the disk when the plate is turned, a spring about said shaft having one end anchored to the gear plate and its other end anchored to said shaft, a ratchet carried by said shaft, a pawl carried by said gear plate and engaging said ratchet, and a threaded stem passing through said upper section with its inner end portion entering the forward pocket in position to engage the gear plate and holding the gear plate stationary while turning the shaft to wind the spring of the gear plate.

2. An artificial lure comprising a body of buoyant material formed internally with front and rear pockets communicating with each other through a throat between the pockets, there being a passage extending from the rear pocket through the rear end of said body, a paddle back of said body having a shank extending forwardly through the passage and pivotally mounted therein with its forward portion extending into the rear pocket and constituting an arm for the paddle, a spring yieldably holding the arm and paddle in a normal position axially of the body, a disk rotatably mounted in the rear pocket and having gear teeth about its margin, lugs extending upwardly from said disk for engaging said arm intermittently imparting swinging movement to the paddle transversely of the body, said spring returning the paddle to its normal position as the lugs move out of engagement with the arm, a pinion in said throat meshing with the teeth of said disk, and a spring-actuated driving element in the front pocket including a gear meshing with said pinion.

3. An artificial lure comprising a body of buoyant material formed internally with a pocket having front and rear portions, and a passage extending from the pocket through the rear end of the body, a paddle back of said body having an arm extending longitudinally through said passage and pivotally mounted therein with its forward portion projecting into the rear portion of said pocket, a spring yieldably holding said arm and paddle in a normal position, a gear rotatably mounted in the rear portion of said pocket and provided with abutments spaced from each other circumferentially of the gear and adapted to intermittently engage the forward portion of said arm and swing the paddle transversely, said spring returning the paddle to its normal position as the abutments move out of engagement with the arm, and driving means in the forward portion of said pocket operatively connected with said gear for imparting rotary motion to the gear.

4. An artificial lure comprising a body of buoyant material formed internally with intercommunicating front and rear pockets and with a passage extending from the rear pocket through the rear end of the body, an impeller back of said body having an arm extending through the passage and into the rear pocket, a gear rotatably mounted in the rear pocket and provided with abutments for successively engaging said arm and imparting movement to the impeller during rotation of the gear, driving means in the front pocket including a gear, and means for transmitting rotary motion from the gear of the driving element to the gear in the rear pocket.

5. An artificial lure comprising a buoyant body formed internally with a pocket and with a passage extending from the pocket through the rear end of the body, an impeller back of said body having an arm passing through the passage and into the pocket, a spring yieldably holding said impeller in a normal position, driving means in said pocket including a rotatable shaft having an end portion protruding from the body for engagement by winding means, a gear plate about said shaft within said pocket, a spring about said shaft having one end anchored to the shaft and its other end anchored to the gear plate, a ratchet carried by said shaft, a pawl carried by the gear plate and engaging said ratchet, a threaded stem having an outer end portion protruding from the body and an inner end portion extending into the pocket in position for engaging the gear plate and holding the gear plate stationary while the shaft is wound to tighten the spring about the shaft, and a member rotatably mounted in said pocket and receiving rotary motion from the gear plate and provided with abutments for successively engaging said arm and intermittently imparting movement to said impeller.

WILLIAM HENRY RIGGAN.

REFERENCES CITED

The following references are of record in the file of this patent:

UNITED STATES PATENTS

| Number | Name | Date |
| --- | --- | --- |
| 726,020 | Bryan | Apr. 21, 1903 |
| 726,021 | Bryan | Apr. 21, 1903 |
| 891,037 | Caldwell | June 16, 1908 |
| 1,801,579 | Sunday | Apr. 21, 1931 |